(12) United States Patent
Bain

(10) Patent No.: US 11,810,125 B1
(45) Date of Patent: Nov. 7, 2023

(54) SYSTEMS AND METHODS FOR A HYBRID GUIDED COMMUNICATION SESSION

(71) Applicant: Salucro Healthcare Solutions, LLC, Phoenix, AZ (US)

(72) Inventor: S Clayton Bain, Phoenix, AZ (US)

(73) Assignee: SALUCRO HEALTHCARE SOLUTIONS, LLC, Phoenix, AZ (US)

( * ) Notice: Subject to any disclaimer, the term of this patent is extended or adjusted under 35 U.S.C. 154(b) by 914 days.

(21) Appl. No.: 16/244,432

(22) Filed: Jan. 10, 2019

Related U.S. Application Data

(60) Provisional application No. 62/615,878, filed on Jan. 10, 2018.

(51) Int. Cl.
| | |
|---|---|
| *G06Q 30/01* | (2023.01) |
| *H04M 3/51* | (2006.01) |
| *G06F 16/33* | (2019.01) |
| *G06F 16/242* | (2019.01) |
| *H04L 65/1069* | (2022.01) |

(52) U.S. Cl.
CPC ............ *G06Q 30/01* (2013.01); *G06F 16/243* (2019.01); *G06F 16/3344* (2019.01); *H04L 65/1069* (2013.01); *H04M 3/5191* (2013.01)

(58) Field of Classification Search
CPC ...... G06Q 30/01; G06Q 30/02; H04M 3/5166; H04M 3/5235; H04M 2203/401; H04M 2203/551; H04M 3/5175; H04M 3/5183; H04M 3/5191; H04M 3/00; H04M 3/4936; H04M 5/00; H04L 51/02; H04L 51/04; G06F 16/243; G06F 16/3344; H04L 65/1069; H04M 3/519
USPC ................. 705/1.1, 2; 279/265.09; 709/205; 348/14.02; 705/7.14; 379/265

See application file for complete search history.

(56) References Cited

U.S. PATENT DOCUMENTS

| | | | | |
|---|---|---|---|---|
| 6,615,240 | B1* | 9/2003 | Sullivan et al. | H04L 67/75 709/205 |
| 2014/0022328 | A1* | 1/2014 | Gechter et al. | G06Q 10/06 348/14.02 |
| 2014/0119531 | A1* | 5/2014 | Tuchman et al. | H04M 3/5166 379/265.09 |
| 2014/0314225 | A1* | 10/2014 | Riahi et al. | H04L 51/02 379/265.09 |
| 2015/0019250 | A1* | 1/2015 | Goodman et al. | G16H 40/63 705/2 |
| 2015/0227941 | A1* | 8/2015 | Tuchman et al. | H04M 3/5183 705/7.14 |
| 2018/0124245 | A1* | 5/2018 | Klein et al. | H04L 67/02 379/265 |

FOREIGN PATENT DOCUMENTS

WO 2014071252 A1 * 5/2014 ............. H04M 3/5141

* cited by examiner

*Primary Examiner* — Lynda Jasmin
*Assistant Examiner* — Kimberly L Evans
(74) *Attorney, Agent, or Firm* — SNELL & WILMER L.L.P.

(57) ABSTRACT

Systems, methods, and computer-readable media are provided for hybrid guidance of a communication session. In one aspect, a system includes one or more processors configured to execute computer-readable instructions to receive an inquiry from a user terminal; stream the inquiry to one or more support terminals configured to provide live support for the inquiry; determine if an automated response to the inquiry is available; and provide one of the automated response or a live response to the inquiry based on whether the automated response to the inquiry is available or not.

20 Claims, 5 Drawing Sheets

SYSTEMS AND METHODS FOR A HYBRID GUIDED COMMUNICATION SESSION

RELATED APPLICATIONS

The application claims priority to U.S. Provisional Application 62/615,878 filed on Jan. 10, 2018, the entire content, of which is incorporated herein by reference.

TECHNICAL FIELD

The present technology pertains in general to providing a hybrid system and platform of guiding a user through a communication session with an entity, where the hybrid platform enables both an automated support for a user inquiry and a live support for a user inquiry.

BACKGROUND

Currently, there are numerous web applications that support handling of user inquiries at, for example, communication centers. These web applications are often difficult to navigate and/or are resource intensive Users may encounter many issues while attempting to complete certain interactions such as obtaining answers to inquiries, with such web applications.

Attempts have been made to improve the user experience by providing live support to users. Shortcomings of such live support systems include, but are not limited to, labor intensiveness of such approach, lack of assurance in availability of a solution to every possible inquiry made by any user and the need for the support staff to generate solutions on the fly, if one does not exist in the manuals and finally the labor intensive process of documenting the generated solutions for future use.

Another solution includes chat-bot support, which allows for communication with the user through modes of communication, including text-based and voice-based messages. Shortcomings of such chat-bot approach include, but are not limited to, difficulties encountered by users to describe the exact nature of their inquiry through a chat box, needs for availability of scripted solutions that the chat-box can then retrieve and provide to the user Accordingly, better and more reliable systems for guiding and servicing user-initiated communications and inquiries are needed

SUMMARY

One or more aspects of the present disclosure relate to providing a hybrid system and platform of guiding a user through a communication session with an entity, where the hybrid platform enables both an automated support for a user inquiry and a live support for a user inquiry.

In one aspect, a system includes one or more processors configured to execute computer-readable instructions to receive an inquiry from a user terminal; stream the inquiry to one or more customer support terminals configured to provide live support for the inquiry, determine if an automated response to the inquiry is available, and provide one of the automated response or a live response to the inquiry based on whether the automated response to the inquiry is available or not.

In another aspect, the one or more processors are configured to execute the computer-readable instructions to stream, in addition to the inquiry, a state of an application or web browser accessed at the user terminal to the one or more support, terminals, and the live support includes guiding a user through the inquiry through at least one or more commands based on the inquiry and the state of the application or the web browser.

In another aspect, the one or more commands include highlighting, on the user terminal, one or more response portions to the inquiry or one or more commands to be followed on a screen of the user terminal.

In another aspect, the one or more processors are configured to determine whether the automated response to the inquiry is available by comparing the inquiry to a database of previous inquiries to determine if a match for the inquiry exists.

In another aspect, the one or more processors are configured to perform natural language processing on the inquiry to yield a result and compare the results to the previous inquiries stored in the database in order to determine whether the automated response to the inquiry is available.

In another aspect, the one or more processors are configured to provide the live response, via the one or more support terminals operated by corresponding support operators if the automated response is not available.

In another aspect, the one or more processors are configured to receive an automation request from at least one support terminal to automate a recent inquiry to which a live response has been provided, and automate the recent inquiry and the live response thereto.

In one aspect, a method includes receiving an inquiry from a user terminal; streaming the inquiry to one or more support terminals for providing live support for the inquiry; determining if an automated response to the inquiry is available; and providing one of the automated response or a live response to the inquiry based on whether the automated response to the inquiry is available or not.

In another aspect, the streaming comprises streaming, in addition to the inquiry, a state of an application or web browser accessed at the user terminal to the one or more support terminals, and the live support includes guiding a user through the inquiry through at least one or more commands based on the inquiry and the state of the application or the web browser.

In another aspect, the one or more commands include highlighting, on the user terminal, one or more response portions to the inquiry or one or more commands to be followed on a screen of the user terminal In another aspect, determining whether the automated response to the inquiry is available includes comparing the inquiry to a database of previous inquiries to determine if a match for the inquiry exists.

In another aspect, the method further includes performing natural language processing on the inquiry to yield a result, and comparing the results to the previous inquiries stored in the database in order to determine whether the automated response to the inquiry is available In another aspect, the live response is provided via the one or more support terminals operated by corresponding support operators if the automated response is not available.

In another aspect, the method includes receiving an automation request from at least one support terminal to automate a recent inquiry to which a live response has been provided and automating the recent inquiry and the live response thereto.

In one aspect, one or more computer-readable media include computer-readable instructions, which when executed by one or more processors, cause the one or more processors to receive an inquiry from a user terminal, stream the inquiry to one or more support terminals configured to provide live support for the inquiry; determine if an automated response to the inquiry is available: and provide one of the automated response or a live response to the inquiry based on whether the automated response to the inquiry is available or not.

In another aspect, the execution of the computer-readable instructions by the one or more processors cause the one or more processors to stream, in addition to the inquiry, a state of an application or web browser accessed at the user terminal to the one or more support terminals, and the live support includes guiding a user through the inquiry through at least one or more commands based on the inquiry and the state of the application or the web browser.

In another aspect, the one or more commands include highlighting, on the user terminal, one or more response portions to the inquiry or one or more commands to be followed on a screen of the user terminal In another aspect, the execution of the computer-readable instructions further cause the one or more processors to determine whether the automated response to the inquiry is available by comparing the inquiry to a database of previous inquiries to determine if a match for the inquiry exists.

In another aspect, the execution of the computer-readable instructions further cause the one or more processors to perform natural language processing on the inquiry to yield a result and compare the results to the previous inquiries stored in the database in order to determine whether the automated response to the inquiry is available.

In another aspect, the execution of the computer-readable instructions further cause the one or more processors to receive an automation request from at least one support terminal to automate a recent inquiry to which a live response has been provided, and automate the recent inquiry and the live response thereto.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
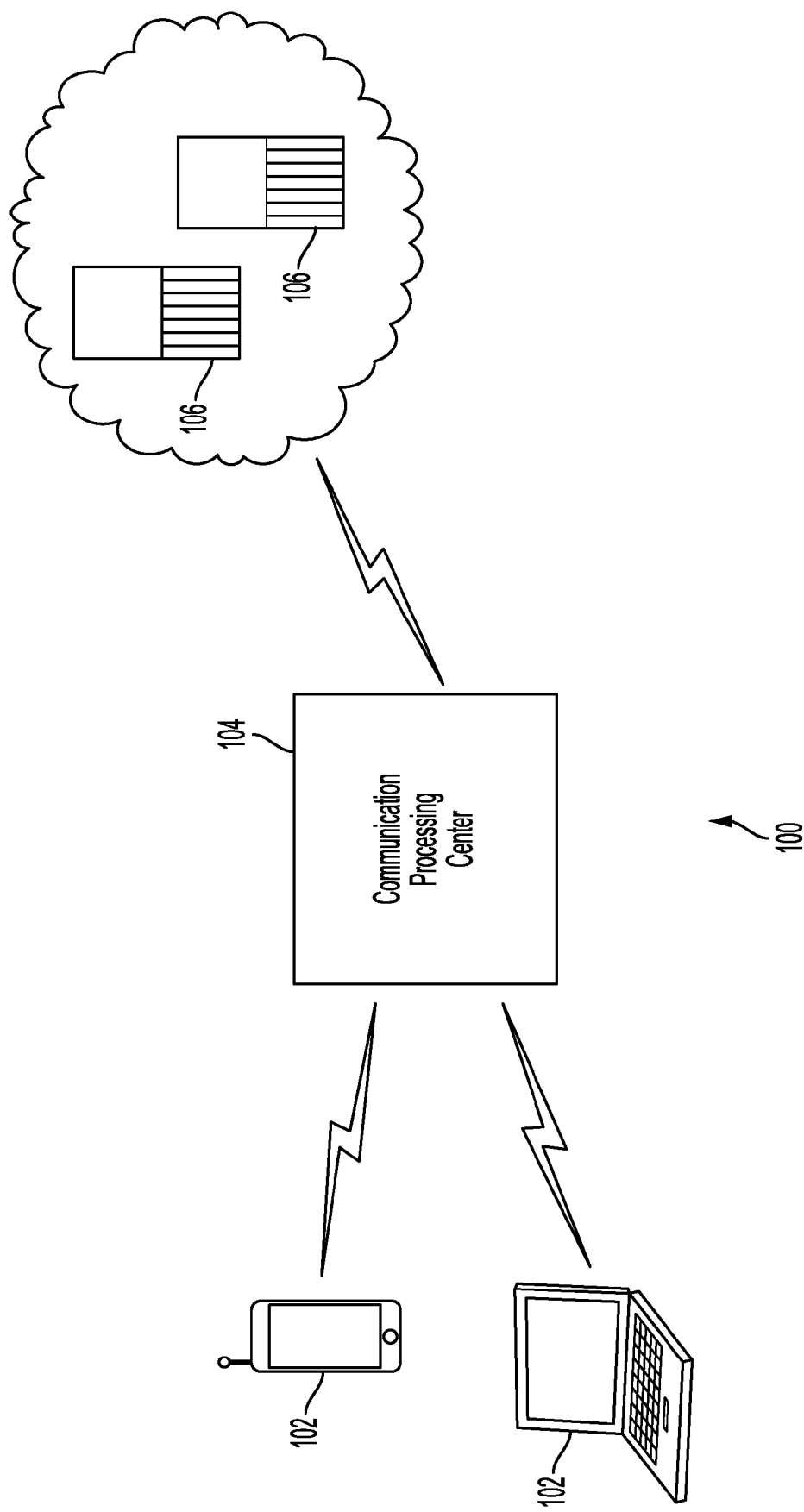
FIG. 1 illustrates an example of network architecture and associated components, according to an aspect of the present disclosure, FIG. 2 describes example components of a communication processing center, according to one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A client can include a device and/or application seeking to execute a function on an Execution Endpoint. Non-limiting examples of a client can include a desktop computer, a mobile phone, a laptop, a tablet, etc.

Disclosed herein are example embodiments directed to providing a hybrid system and platform of guiding a user through a communication session with an entity, where the hybrid platform enables both an automated support for a user inquiry and/or alternatively a live support, for a user inquiry This hybrid system or platform provides an end user, accessing a system via one or more associated user terminals (end user terminals), the ability to receive a hybrid or a combination of live and automated support for one or more inquiries made by the user. For example, when a user makes an inquiry (e.g., a question regarding the user's account or the services offered), the system may already have addressed the inquiry (provided a resolution to an inquiry) in the past and thus may have available, in a database, answer(s)/resolutions to the inquiry, which can then be automatically provided to the user on his or her user terminal without resorting to live support for a resolution to the inquiry.

On the other hand, when a response or responses to an inquiry or inquiries made by a particular user is/are not available, the hybrid system provides a live support, whereby the inquiries are live streamed to a support terminal (operated by a support staff). Enhanced communication capabilities of this hybrid system allows live guided prompts to be provided to the user that are more interactive than currently available text-based solutions. Such live guided prompts may include more than providing prompts or commands within an existing chat box. For example, various pop up messages may appear alongside different portions or sections of a website to guide the user or direct the user through a resolution.

Various examples of this hybrid system will be described below. The disclosure now begins with examples of architecture and components of the above described hybrid system.

FIG. 1 illustrates an example of network architecture and associated components, according to an aspect of the present disclosure. As shown in FIG. 1, setting 100 includes one or more end user terminals 102, a communication processing center 104 and one or more storage components 106. Setting 100 is an example system in which hybrid platform for guiding communication sessions may be implemented.

One or more end user terminals 102 can be any type of known or to be developed device capable of establishing a wired and/or wireless communication session with communication processing center 104. Examples of end user terminals 102 include, but are not limited to, a mobile device, a laptop, a desktop computer, a tablet, etc. Each of the one or more end user terminals 102 may be operated by a user such as a human being. Furthermore, two or more of the end user terminals 102 may be operated by a single user. While FIG. 1 illustrates two end user terminals 102, the present disclosure is not limited thereto and setting 100 can include any number of end user terminals 102 that may access communication processing center 104 for a response to an inquiry. The inquiry may be any type of known question or issue for which a user may seek a response or a solution. For example, a user may be a customer of a business entity associated with communication processing center 104. The user may make an inquiry regarding a recent product or a business transaction conducted with the business entity. Therefore, the user, via a corresponding end user terminal 102, may make the inquiry and seek a response thereto from communication processing center 104, Furthermore and as will be described below, each one of end user terminals 102 may have an application downloaded and installed thereon, through which an end user may make inquiries to communication processing center 104 and receive responses thereto.

Communication processing center 104 can be physically located in one geographical area or over multiple geographical areas and communicatively connected. As will be further described with reference to FIG. 2, communication processing center 104 can include one or more support stations operated by support staff, a communication receiving and processing component for receiving communications, telephonic or via internet, processing them, load balancing them between available support stations, monitoring content of inquiries made by end users, recording solutions and responses thereto, storing them, running inquiries and live support solutions through machine learning algorithms to generate and store automatic responses for such inquiries for future use, etc. Communication processing center 104 can operate using an enterprise network or by connecting to available wired and/or wireless local area networks. As noted, further detailed discussion of components of communication processing center 104 will be further described with reference to FIG. 2.

Setting 100 also includes one or more storage components 106. Storage components 106 can include one or more cloud-based storage facilities accessible by communication processing center 104, which may be hosted on private, public and/or hybrid cloud storage service providers. Such cloud-based storage facilities can be accessed via any type of known or to be developed, secured access protocol and communication means.

In another example, storage components 106 may not be cloud hosted but may rather be physically located and connected to data processing components of communication processing center 104. For example, storage components 106 can be any type of known or to be developed data storage component(s) physically installed in the same facility at which other components of communication processing center 104 are located, installed an operational.

While certain exemplary components of setting 100 are described with reference to FIG. 1, setting 100 of the present disclosure is not limited thereto and may include any other known or to be developed component of ordinary operation thereof including, but not limited to, routers, switches, transceivers, communication cables such as fiber optics cables, etc.

Figure 2:
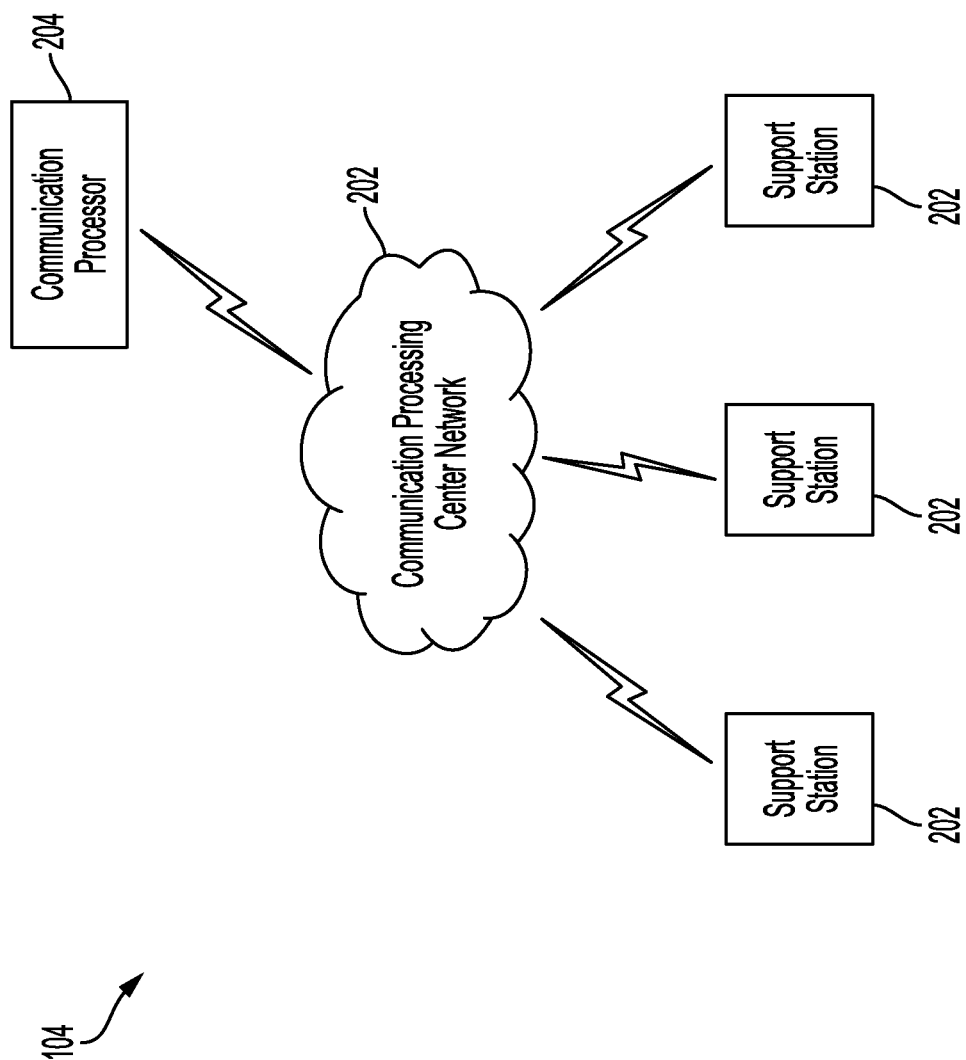

FIG. 2 describes example components of a communication processing center, according to one aspect of the present disclosure. As shown in FIG. 2, communication processing center 104 may include a network 200, which may be a private network (e.g., an enterprise network). Network 200 may enable communication and connection among various components of communication processing center 104. In another example, network 200 may be a local area network.

Communication processing center 104 may include one or more support stations 202, each of which may be operated by a support staff. Support stations 202 may be physically located within a single geographical area, where communication processing center 104 is or may remotely connect to communication processing center 104 via network 200. Support stations 202 may be any type of known or to be developed computer such as a laptop, a desktop computer, a tablet, a mobile device, etc. The number of support terminals 202 is not limited to that shown in FIG. 2 and instead can be more or less than three support terminals 202 shown in FIG. 2.

Communication processing center 104 further includes a communication processor 204. communication processor 204 may be a standalone device (e.g., a computer), a server or a network of two or more connected computers and servers configured to execute computer-readable instructions to process incoming inquiries from end user terminals 102 and provide/enable a hybrid servicing of the inquiries, as will be described below.

Similar to storage components 106, communication processor 204 may be physically located in a geographical area as storage components 106 and/or support terminals 202 or may be remotely connected thereto using any known or to be developed secured wired/wireless communication schemes and methods.

In one example and in order to implement the above described hybrid platform for servicing an inquiry or providing a hybrid guided communication session, communication processing center 104 may install applications corresponding to the hybrid platform on each end user terminal 102 and each support terminal 202. A corresponding operator (e.g., user or support staff) may login to the hybrid platform via his or her terminal to access the platform and receive or provide a response to an inquiry, as will be described below. Accordingly, each one of users and support staff may have a pre-established credential (username and password) registered with entity associated with communication processing center 104, which may be stored in one or more of data storages 106.

As noted above, communication processing center 104 may be associated with one or more business entities. For example, communication processing center 104 may be associated with and operated by an online retail store. Hereinafter, several example processes will be described for servicing an inquiry made by an end user using a hybrid platform of the present disclosure. This may also be referred to as a hybrid guided communication session.

Figure 3:
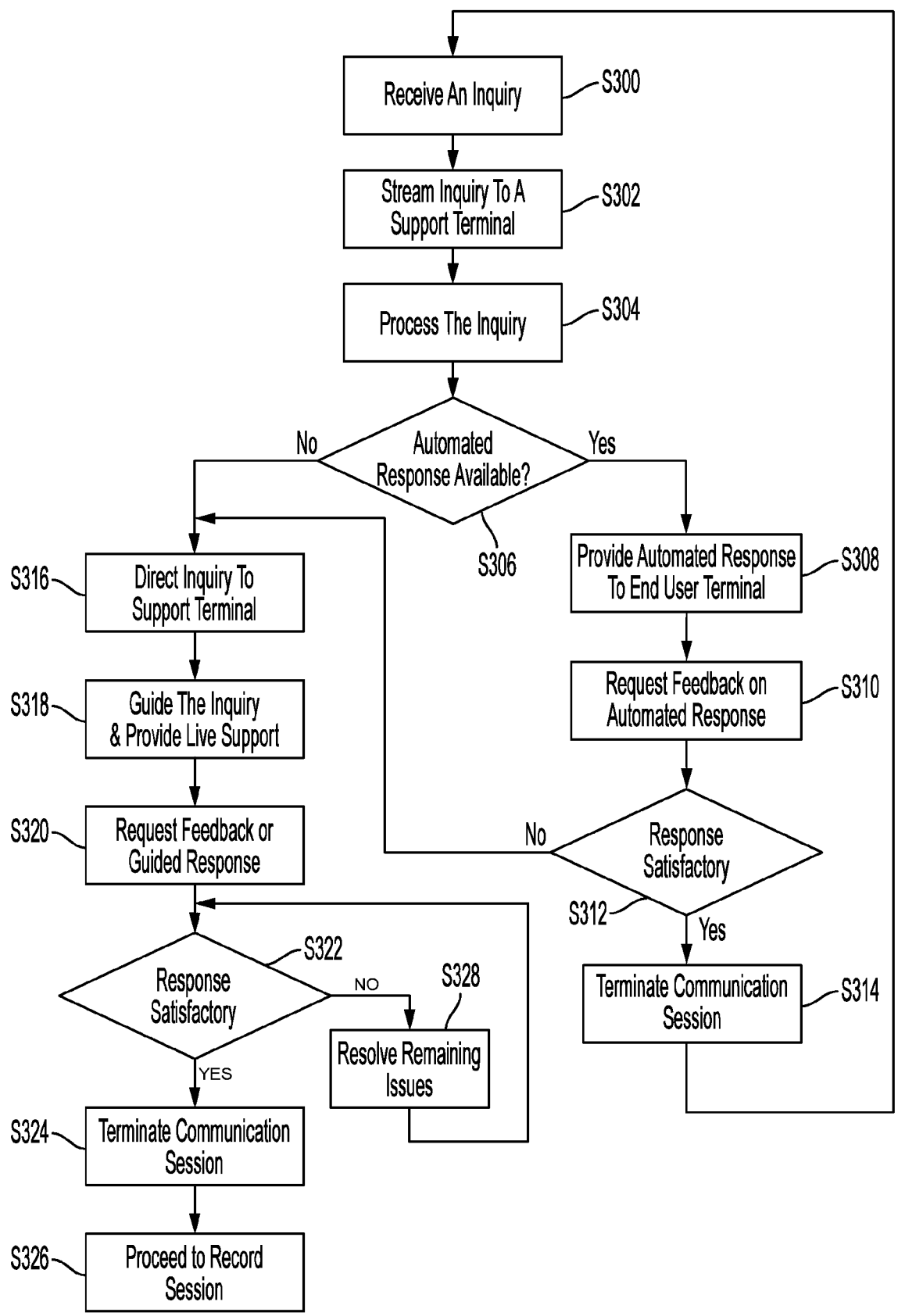
FIG. 3 describes an example process of guiding a communication session, according to an aspect of the present disclosure.

FIG. 3 describes an example process of guiding a communication session, according to an aspect of the present disclosure. FIG. 3 will be described from perspective of communication processor 204 running computer-readable instructions corresponding to the hybrid platform. It will be appreciated by those having ordinary skill in the art that communication processor(s) 204 of communication processing center 104 may execute computer-readable instructions (stored on an associated memory thereof) to implement functionalities described below with reference to FIG. 3. Furthermore, FIG. 3 will be described with reference to components of FIGS. 1 and 2.

In describing FIG. 3, an assumption is made that end user applications of the hybrid platform are already installed and running on end user terminals 102 and/or support terminal s 202.

At S300, communication processor 204 may receive an inquiry from a user via an associated one of end user terminals 102. The user may provide the inquiry after logging into the application of the hybrid platform installed on the associated one of end user terminals 102. In another example, the hybrid platform may not need the user to login to the hybrid platform to make an inquiry Instead the application may be a web-browser embedded plug-in or application that may automatically pop up on a screen of the associated one of end user terminals 102 when the user accesses a webpage associated with communication processing center 104.

In one example, communication processor 204 may receive multiple inquiries from multiple end user terminals 102 at S300 and may process them in parallel according to remaining steps of FIG. 3, as will be described below.

An inquiry received at S300 may be a question regarding a recent charge, services offered by a business entity associated with communication processing center 104, etc. For example, an inquiry may be directed to a total balance of the user (e.g., "I'd like to see Sally's remaining balance").

In one example, the user, upon accessing the application (e.g., an embedded chat box), may type in the inquiry and transmit the inquiry to communication processor 204.

At S302, communication processor 204 streams the inquiry received at S300, on a screen of a support terminal 202. In one example, the inquiry may be streamed to any one of available support terminals 202, which is not actively serving another inquiry.

In one example, such streaming not only includes streaming the inquiry but also a state of the application, web browser, etc. that is currently being displayed on the end user terminal 102 from which the inquiry is received. Such State may also include user's activity on the displayed application, web browser such as the movement of a mouse on the application/web browser, any type of textual context being typed into the application/web browser by the user, etc. Such state, as will be further described below, may be utilized in order to improve the automated and live support to a user at the end user terminal 102 in response to the inquiry made by the user.

Access to the user's application state provides opportunities for directing commands toward visible user interface elements on end user terminal 102, accommodating more efficient resolutions to the inquiry, etc. Furthermore, as the user at end user terminal 102 continues to interact with the application on end user terminal 102, a differential application state is streamed to the support terminal. In automated support encounters, the differential application state is analyzed to determine progress toward resolution of/response to the inquiry At S304, communication processor 204 processes the inquiry. Such processing may include any known or to be developed methods, an example of which may be natural language processing that would analyze and determine content of the inquiry For example, when the inquiry is "I'd like to see Sally's remaining balance," communication processor 204 processes various segments of the inquiry (parses the inquiry) to determine that (1) Sally is a name of a person, (2) "remaining balance" is a key phrase of the inquiry and (3) that the inquiry has positive/neutral sentiment.

At S306, communication processor 204 determines, based on processing at S304, whether an automated response to the inquiry is available or not. In the example of Sally's remaining balance, communication processor 204, after parsing the inquiry, may access one or more of data storages 106 to see if a record of Sally's balance, recent payments and charges exists. If so, communication processing center 104 may retrieve such information and determine an updated balance for Sally. Accordingly, communication processor 204 may determine that an automated response to the inquiry is available.

In one example, in addition to the inquiry (e.g., Sally's remaining balance), communication processor 204 also analyzes, using known or to be developed methods and processing algorithms, the streamed state of the end user terminal 102 from which the inquiry is received. Such state may be utilized to obtain additional context around the inquiry. For example, while the inquiry is Sally's remaining balance, analyzing the state of application/web browser may suggest that the user is logged into a credit card website rather than a healthcare account, which may then result in a more targeted automated resolution to the inquiry being found in data storages 106.

Thereafter, at S308, communication processor 204 may provide the automated response to end user terminal 102 via which the inquiry was received at S300. The response may appear in the same chat box through which the inquiry was originally made by the user at corresponding end user terminal 102.

Thereafter, at S310, communication processor 204 may prompt the user to provide a feedback on the response to the inquiry. For example, a message may appear on the end user terminal 102 of the user that requests an answer to "Was the response satisfactory?"

At S312, communication processor 204 determines if the feedback received from end user terminal 102 indicates that the response is satisfactory. If the feedback indicates that the response is satisfactory, at S314, communication processing center 104 terminates the communication session between the corresponding end user terminal 102 and communication processing center 104 (including terminating streaming of the inquiry on a support terminal, which was initiated at S302). Thereafter, the process reverts back to S300.

However, if communication processor 204 determines, based on the feedback, that the response is not satisfactory at S312, then the process proceeds to S316, as will be described below.

While requesting and receiving response to feedbacks constitute one example of determining whether a response or a resolution has been satisfactory or not, the present disclosure is not limited thereto. There can be other means of determining whether a response or a resolution has been satisfactory or not. For example, communication processor 204, upon providing the automated response at S308, may observe the state of the end user terminal 102 for a threshold period of time to determine subsequent interactions of the user with the displayed application/web browser. For example, if such state suggests that the user has moved to user another application or has browsed to a different website, communication processor 204 may take that as an indication that the response to the inquiry or resolution thereof has been deemed satisfactory by the user at end user terminal 102.

Referring back to S306, if communication processor 204 determines that an automated response to the inquiry is not available, then at S316, communication processor 204 directs the support, terminal 202 to which the inquiry is being streamed to guide/provide answer to the inquiry.

At S318, via the corresponding support terminal 202, communication processor 204 may provide live guidance and response to the inquiry. In one example, such live guidance can include, in addition to one or more text-based questions asking for clarification or follow up questions to the inquiry, guiding the user through the inquiry. Such guidance can include, for example, highlighting a section of the web page being visited by the user on the corresponding end user terminal in order to more clearly guide the user from one step of processing the inquiry to the next.

For example, when a user first makes the inquiry about Sally's remaining balance, and assuming that an automatic response thereto is not available, communication processor 204 may ask for verification of Sally's most recent charge or transaction. In some cases, a simple text-based instructions asking the user to verify Sally's most recent charge may be insufficient and not sufficiently clear (e.g., the user may not know where on the web page to click or provide such answer). Accordingly, a support member, via the corresponding support terminal 202 responsible for providing the live support at S316, may highlight the appropriate portion of the webpage being viewed by the user on the user's corresponding end user terminal 102. This highlighting may be accompanied by a text-based command, asking the user to provide a response in the highlighted portion of the web page.

Similar to the automated response, in case of a live support/guidance at S318, the streamed state of the end user terminal 102 from which the inquiry is received can be considered and utilized. Such state may be utilized to obtain additional context around the inquiry. For example, the live state of the application or web browser can be used to reconstruct the user interface the user is viewing. This provides operator of corresponding support terminal 202, additional context not present in text-based or voice-based support systems. For example, the operator, based on the streamed state of the end user terminal 102, the operator at corresponding support terminal 202 can determine which part of the application or web browser the user is viewing or clicking on. Accordingly, the operator can determine how best and which portions of the web browser or application to highlight for or prompt the user to click during resolving of the inquiry.

Access to the user's application state provides opportunities for directing commands toward visible user interface elements on end user terminal 102, accommodating more efficient resolutions to the inquiry. Furthermore, as the user at end user terminal 102 continues to interact with the application on end user terminal 102, the differential application state is streamed to the support terminal. In live guidance or support situations, the reconstruction of the user interface state may be updated periodically on the corresponding support terminal 202, providing visibility into progress toward resolution of the inquiry.

Accordingly, at S318, the live support includes not only a direct text-based communication (and/or alternatively a telephonic or voice-based communication between the user and the support staff) but may also include an active and remote guiding of the user through the inquiry process on his or her end user terminal 102, where such active and remote guidance is provided in real-time by the support staff via the corresponding support terminal 202

Thereafter, communication processor 204 may perform S320, which may be similar to S310, where communication processing center 104 may prompt the user to provide a feedback on the response to the inquiry. For example, a message may appear on the end user terminal 102 of the user that requests an answer to "Was the response satisfactory?" or "Were your questions answered fully?"

At S322, communication processor 204 determines if the feedback received from end user terminal 102 at S320 indicates that the response/live support provided at S318 is satisfactory. If the feedback indicates that the response/live support provided at S318 is satisfactory, at S324, communication processing center 104 terminates the communication session between the corresponding end user terminal 102 and communication processor 204 (including terminating streaming of the inquiry on a support terminal, which was initiated at S302). Thereafter, at S326, the process proceeds to FIG. 4, which will be described below.

However, if at S322, communication processor 204 determines that the feedback received from end user terminal 102 at S320 indicates that the response/live support provided at S318 is not satisfactory, then at S328, communication processing center 104 may resolve remaining issues. This may include establishing a voice and/or video communication session with the user to follow up on any remaining issues or unanswered portions of the inquiry, asking clarifying question and providing response to the inquiry.

Thereafter, the process reverts back to S322 and communication processing center 104 repeats S322 to S328, as described above.

As noted above, hybrid platform of the present disclosure can learn from each instance of an inquiry and responses provided thereto to build a database of inquiries and responses, to be used in servicing future inquiries (e.g., through provided automated responses). Hybrid platform of the present disclosure may take as input each inquiry and responses thereto and apply machine learning algorithm thereto, so that already provided responses to inquiry can be automatically used for any similar/same inquiry in the future.

Every time an inquiry is received to which an automated response is not available, the hybrid platform can be used to create a new instance of an automated response for future use. Therefore, when an inquiry is directed to a support, terminal at S316 in FIG. 3, such inquiry would be an example of a new inquiry, the live guidance and response to which can be automated for future use. Such automation process will now be described with reference to FIG. 4.

Figure 4:
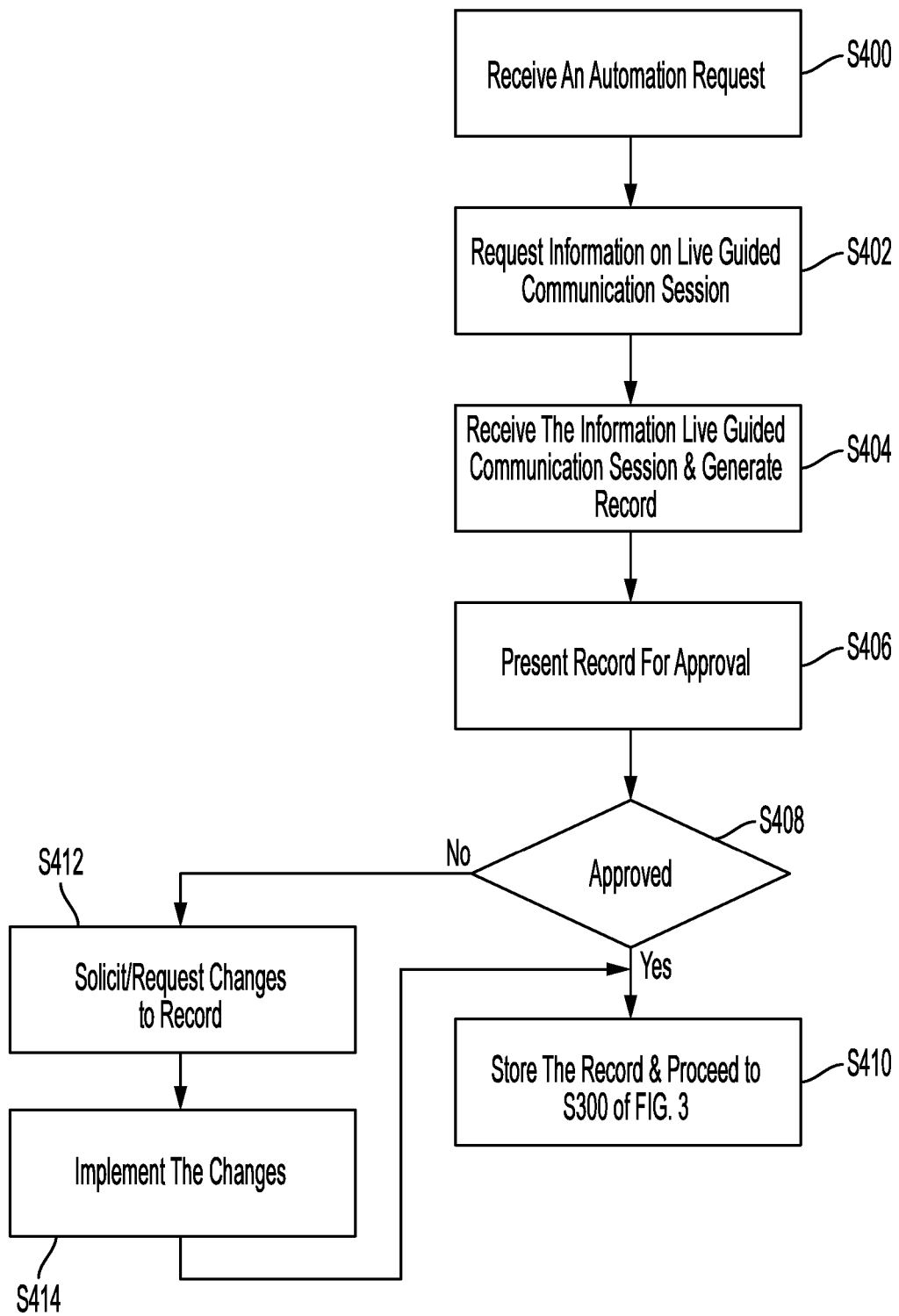
FIG. 4 describes an example process of recording and automating a guided communication session, according to an aspect of the present disclosure.

FIG. 4 describes an example process of recording and automating a guided communication session, according to an aspect of the present disclosure. FIG. 4 will be described from perspective of communication processor 204 running computer-readable instructions corresponding to the hybrid platform. It will be appreciated by those having ordinary skill in the art that communication processor(s) 204 of communication processing center 104 may execute computer-readable instructions (stored on an associated memory thereof) to implement functionalities described below with reference to FIG. 4. Furthermore, FIG. 4 will be described with reference to components of FIGS. 1 -3.

Similar to FIG. 3, in describing FIG. 4, an assumption is made that end user applications of the hybrid platform are already installed and running on end user terminals 102 and/or support terminals 202.

At S400 and after a live guided communication session has been deemed satisfactory by the user associated with the initial inquiry, per S322 of FIG. 3, communication processor 204 receives an automation request for automating a recent live guided communication session that was terminated at S324. This automation request may be received from a support station 202 via which the recent live guided communication session was processed.

At S402, communication processor 204 may prompt the requesting party (e.g., the support staff associated with a support station 202 via which the recent live guided communication session was processed) to provide information on the recent live guided communication session. This information may include, but is not limited to, the inquiry, various questions associated with the inquiry, the responses provided thereto, etc.

At S404, communication processor 204 may receive the information requested at S402 and generate a record of the information provided.

At S406, communication processor 204 may present the generated record to the support staff associated with a support station 202 via which the recent live guided communication session was processed, for approval.

At, S408 and upon receiving a response to the requested approval, communication processor 204 may determine if the generated record was approved. If approved, at S410, communication processor 204 may record (store) the record in one or more of data storages 106. The stored record may then be used in future inquiries as an automated response, assuming the response to such future inquiries matches the stored automated response. Thereafter, the process may revert back to S300 of FIG. 3.

However if the record is not approved at S408, then at S412, communication processor 204 may prompt the support, staff (receive from support, staff) changes to the record. At S414, communication processor 204 may apply the changes and the process may revert back to S410.

The above provide various example configurations and processes employed by hybrid platform of the present disclosure to enable a hybrid guidance of user inquiries that move beyond a simple automated response to a simple text-based solution. The hybrid platform, by implementing the processes of FIGS. 3 and 4, optimizes the selection of either an automated response or a live response/guidance of an inquiry, where the live response/guidance includes a step by step interactive approach of guiding the inquiring party (e.g., the user) through the process of obtaining an answer to an inquiry.

In one example, setting 100 of FIG. 1 and communication processing center 104 (hybrid platform of the present application) may be capable of interfacing with third party service providers. In other words, the hybrid platform can be provided to third parties (e.g., retailers, healthcare service providers, etc.) as a ready-to-use platform that the system of such third parties can plug in and implement for use.

Such interfacing may allow the third parties not only the option to use the hybrid system described above to provide both automated and live support to their users" inquiries but may instead use the hybrid system in conjunction with their own system to enhance/expand their automated/live support capabilities to find automated/live resolutions to user inquiries With the above, the disclosure now turns to describing example architecture and components of various components of setting 100 including communication processor(s) 204, support terminals 202 and/or end user terminals 102.

Figure 5:
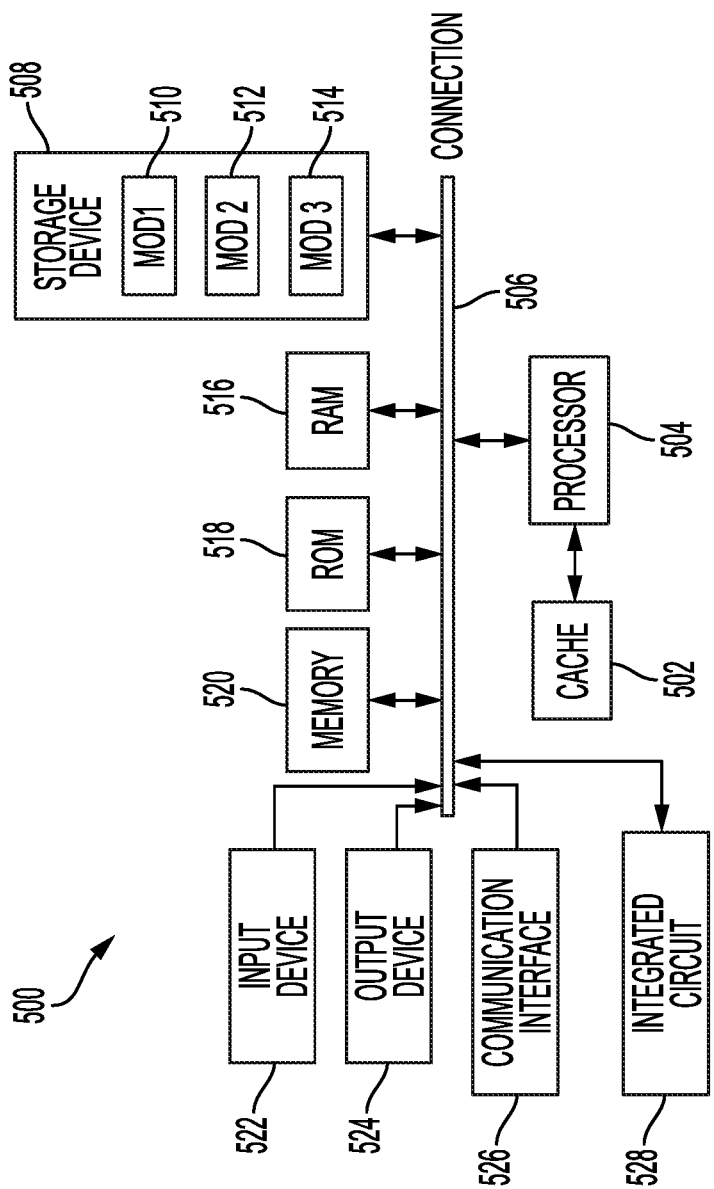
FIG. 5 illustrates an example system including various hardware computing components, according to an aspect of the present disclosure.

FIG. 5 illustrates an example system including various hardware computing components, according to an aspect of the present disclosure.

FIG. 5 illustrates an example system including various hardware computing components, according to an aspect of the present disclosure. The more appropriate example embodiment will be apparent to those of ordinary skill in the art when practicing the present technology. Persons of ordinary skill in the art will also readily appreciate that other system embodiments are possible.

FIG. 5 illustrates a system bus computing system architecture 500 wherein the components of the system are in electrical communication with each other using a connection 506. Exemplary system 500 includes a cache 502 and a processing unit (CPU or processor) 504 and a system connection 506 that couples various system components including the system memory 520, such as read only memory (ROM) 518 and random access memory (RAM) 516, to the processor 504. The system 500 can include a cache of high-speed memory connected directly with, in close proximity to, or integrated as part of the processor 504. The system 500 can copy data from the memory 520 and/or the storage device 508 to the cache 502 for quick access by the processor 504. In this way, the cache can provide a performance boost that avoids processor 504 delays while waiting for data. These and other modules can control or be configured to control the processor 504 to perform various actions. Other system memory 520 may be available for use as well. The memory 520 can include multiple different types of memory with different performance characteristics. The processor 504 can include any general purpose processor and a service component, such as service 1 510, service 2 512, and service 3 514 stored in storage device 508, configured to control the processor 504 as well as a special-purpose processor where software instructions are incorporated into the actual processor design. The processor 504 may essentially be a completely self-contained computing system, containing multiple cores or processors, a bus, memory controller, cache, etc. A multi-core processor may be symmetric or asymmetric To enable user interaction with the computing system 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with the computing system 500. The communications interface 526 can generally govern and manage the user input and system output. There is no restriction on operating on any particular hardware arrangement and therefore the basic features here may easily be substituted for improved hardware or firmware arrangements as they are developed.

Storage device 508 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 516, read only memory (ROM) 518, and hybrids thereof.

The system 500 can include an integrated circuit 528, such as an application-specific integrated circuit (ASIC) configured to perform various operations. The integrated circuit 528 can be coupled with the connection 506 in order to communicate with other components in the system 500.

The storage device 508 can include software services 510, 512, 514 for controlling the processor 504. Other hardware or software modules are contemplated. The storage device 508 can be connected to the system connection 506. In one aspect, a hardware module that performs a particular function can include the software component stored in a computer-readable medium in connection with the necessary hardware components, such as the processor 504, connection 506, output device 524, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting, "at least one of A and B" means A, B, or A and B.

What is claimed is:

1. A system comprising:
a processor; and
a tangible, non-transitory memory configured to communicate with the processor,
the tangible, non-transitory memory having instructions stored thereon that, in response to execution by the processor, cause the processor to perform operations comprising:
receiving an inquiry from a user via a user terminal having an inquiry application and a web browser;
streaming the inquiry to one or more support terminals that are open and configured to provide live support for the inquiry, wherein the one or more support terminals having the inquiry application, and wherein the inquiry is streamed along with multiple other inquiries in parallel;
streaming, to the one or more support terminals, a state of the user terminal, wherein the state of the user terminal includes a state of the inquiry application, a state of the web browser that is currently being displayed on the user terminal, user activity on the inquiry application, movement of a mouse of the user on at least one of the inquiry application or web browser and textual context being typed into at least one of the inquiry application or web browser;
determining if an automated response to the inquiry is available by searching a database of responses;
providing, to the user terminal, the automated response to the inquiry, in response to the automated response being in the database or responses;
providing, to the user terminal, the live support for the inquiry, in response to a lack of availability of the automated response;
providing, to the user terminal in real-time and in response to the state of the user terminal and the inquiry, prompts in a chat box, commands in a chat box, highlights of a screen of the user terminal, text based requests to the user terminal, prompts for the user to click and pop up messages alongside a portion of a website on the user terminal to guide the user through a resolution of the inquiry;

receiving, from the user terminal, a differential state of the user terminal with updates to the state of the user terminal, streaming the differential state of the user terminal to the one or more support terminals;

determining progress toward the resolution of the inquiry, based on the differential state of the user terminal;

receiving, from the user terminal, feedback if the resolution was satisfactory;

receiving information from the one or more support terminals regarding the live support; and updating the database of responses with the information to create additional of the automated responses.

2. The system of claim 1, further comprising:
receiving, after providing the automated response, the differential state of the user terminal during a period of time;
determining additional interactions by the user with the user terminal during the period of time; and
determining that the resolution was satisfactory based on the interactions.

3. The system of claim 1, further comprising reconstructing a user interface of the user terminal.

4. The system of claim 1, further comprising resolving remaining issues with the user using at least one of a voice session, video session or asking clarifying questions.

5. The system of claim 4, further comprising:
performing natural language processing on the inquiry to yield a result comprising a name of the user, a key phrase of the inquiry and a determination that the inquiry is at least one of a positive, neutral or negative statement and comparing the result to the previous inquiries stored in the database in order to determine whether the automated response to the inquiry is available.

6. The system of claim 1, wherein the information from the one or more support terminals regarding the live support includes the inquiry, questions associated with the inquiry and responses provided to the inquiry.

7. The system of claim 1, further comprising:
receiving an automation request from at least one support terminal to automate the inquiry; and
updating the database with the information to automate the inquiry, in response to receiving the automation request.

8. A method comprising:
receiving an inquiry from a user via a user terminal having an inquiry application and a web browser;
streaming the inquiry to one or more support terminals that are open and for providing live support for the inquiry, wherein the one or more support terminals having the inquiry application, and wherein the inquiry is streamed along with multiple other inquiries in parallel;
streaming, to the one or more support terminals, a state of the user terminal, wherein the state of the user terminal includes a state of the inquiry application, a state of the web browser that is currently being displayed on the user terminal, user activity on the inquiry application, movement of a mouse of the user on at least one of the inquiry application or web browser and textual context being typed into at least one of the inquiry application or web browser;
determining if an automated response to the inquiry is available by searching a database of responses; and
providing, to the user terminal, the automated response to the inquiry, in response to the automated response being in the database or responses;
providing, to the user terminal, the live support for the inquiry, in response to a lack of availability of the automated response;
providing, to the user terminal in real-time and in response to the state of the user terminal and the inquiry, prompts in a chat box, commands in a chat box, highlights of a screen of the user terminal, text based requests to the user terminal, prompts for the user to click and pop up messages alongside a portion of a website on the user terminal to guide the user through a resolution of the inquiry;
receiving, from the user terminal, a differential state of the user terminal with updates to the state of the user terminal;
streaming the differential state of the user terminal to the one or more support terminals;
determining progress toward the resolution of the inquiry, based on the differential state of the user terminal;
receiving, from the user terminal, feedback if the resolution was satisfactory;
receiving information from the one or more support terminals regarding the live support; and
updating the database of responses with the information to create additional of the automated responses.

9. The method of claim 8, further comprising:
receiving, after providing the automated response, the differential state of the user terminal during a period of time;
determining additional interactions by the user with the user terminal during the period of time; and
determining that the resolution was satisfactory based on the interactions.

10. The method of claim 9, further comprising reconstructing a user interface of the user terminal.

11. The method of claim 8, further comprising resolving remaining issues with the user using at least one of a voice session, video session or asking clarifying questions.

12. The method of claim 11, further comprising:
performing natural language processing on the inquiry to yield a result comprising a name of the user, a key phrase of the inquiry and a determination that the inquiry is at least one of a positive, neutral or negative statement; and
comparing the result to the previous inquiries stored in the database in order to determine whether the automated response to the inquiry is available.

13. The method of claim 8, wherein the information from the one or more support terminals regarding the live support includes the inquiry, questions associated with the inquiry and responses provided to the inquiry.

14. The method of claim 8, further comprising:
receiving an automation request from at least one support terminal to automate the inquiry; and
updating the database with the information to automate the inquiry, in response to receiving the automation request.

15. An article of manufacture including a non-transitory, tangible computer readable storage medium having instructions stored thereon that, in response to execution by a processor, cause the processor to perform operations comprising:
receiving an inquiry from a user via a user terminal having an inquiry application and a web browser;
streaming the inquiry to one or more support terminals that are open and configured to provide live support for the inquiry, wherein the one or more support terminals having the inquiry application, and wherein the inquiry is streamed along with multiple other inquiries in parallel;
streaming, to the one or more support terminals, a state of the user terminal, wherein the state of the user terminal includes a state of the inquiry application, a state of the web browser that is currently being displayed on the user terminal, user activity on the inquiry application, movement of a mouse of the user on at least one of the inquiry application or web browser and textual context being typed into at least one of the inquiry application or web browser;

determining if an automated response to the inquiry is available by searching a database of responses;

providing, to the user terminal, the automated response to the inquiry, in response to the automated response being in the database or responses;

providing, to the user terminal, the live support for the inquiry, in response to a lack of availability of the automated response;

providing, to the user terminal in real-time and in response to the state of the user terminal and the inquiry, prompts in a chat box, commands in a chat box, highlights of a screen of the user terminal, text based requests to the user terminal, prompts for the user to click and pop up messages alongside a portion of a website on the user terminal to guide the user through a resolution of the inquiry;

receiving, from the user terminal, a differential state of the user terminal with updates to the state of the user terminal;

streaming the differential state of the user terminal to the one or more support terminals;

determining progress toward the resolution of the inquiry, based on the differential state of the user terminal;

receiving, from the user terminal, feedback if the resolution was satisfactory;

receiving information from the one or more support terminals regarding the live support; and updating the database of responses with the information to create additional of the automated responses.

16. The article of claim 15, further comprising:

receiving, after providing the automated response, the differential state of the user terminal during a period of time;

determining additional interactions by the user with the user terminal during the period of time; and determining that the resolution was satisfactory based on the interactions.

17. The article of claim 15, further comprising reconstructing a user interface of the user terminal.

18. The article of claim 15, further comprising resolving remaining issues with the user using at least one of a voice session, video session or asking clarifying questions.

19. The article of claim 15, further comprising:

performing natural language processing on the inquiry to yield a result comprising a name of the user, a key phrase of the inquiry and a determination that the inquiry is at least one of a positive, neutral or negative statement; and comparing the result to the previous inquiries stored in the database in order to determine whether the automated response to the inquiry is available.

20. The article of claim 15, further comprising:

receiving an automation request from at least one support terminal to automate the inquiry; and updating the database with the information to automate the inquiry, in response to receiving the automation request.

* * * * *